US006437472B1

(12) United States Patent
Fatula, Jr. et al.

(10) Patent No.: US 6,437,472 B1
(45) Date of Patent: Aug. 20, 2002

(54) APPARATUS FOR WIRELESS TRANSFER OF POWER TO A ROTATING ELEMENT

(75) Inventors: Joseph J. Fatula, Jr.; Robert W. Hitzfeld; Richard Contreras; Guillermo Prada-Silva; Andrew Chiu, all of San Jose, CA (US); Rainer Schieferstein, Saulheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/715,620

(22) Filed: Nov. 17, 2000

Related U.S. Application Data

(62) Division of application No. 09/386,079, filed on Aug. 30, 1999, now Pat. No. 6,278,210.

(51) Int. Cl.[7] ........................ H02K 19/00; H02K 21/00; H02K 27/00

(52) U.S. Cl. .................... 310/112; 310/154.01; 310/46; 310/68 R; 336/115; 336/130

(58) Field of Search ......................... 310/112, 46, 68 R, 310/114, 113, 154, 67 R, 268; 336/115, 117, 118, 119, 120, 122, 123, 130, 131

(56) References Cited

U.S. PATENT DOCUMENTS 2,882,392 A * 4/1959 Sands ...................... 455/178.1
3,317,874 A * 5/1967 Honsinger .................. 336/120
3,401,328 A * 9/1968 Hartung ...................... 310/216
4,223,313 A * 9/1980 Chabrol ................. 340/870.07
4,304,641 A 12/1981 Grandia et al.
4,423,364 A * 12/1983 Kompelien et al. ......... 318/440
4,692,604 A 9/1987 Billings
4,696,729 A 9/1987 Santini
4,829,401 A * 5/1989 Vranken ..................... 361/380
5,055,775 A * 10/1991 Scherz et al. ........ 324/158 MG
5,268,087 A 12/1993 Lu
5,421,987 A 6/1995 Tzanavaras
5,472,592 A 12/1995 Lowery
5,521,444 A * 5/1996 Foreman ..................... 307/104
5,628,892 A 5/1997 Kawashima et al.
5,737,154 A * 4/1998 Kumagi et al. ............. 360/108
5,785,826 A 7/1998 Greenspan
6,042,454 A * 3/2000 Watanabe ...................... 451/6
6,175,461 B1 * 1/2001 Fukuda et al. ................ 360/64

* cited by examiner

*Primary Examiner*—Burton S. Mullins
(74) *Attorney, Agent, or Firm*—Larry B. Guernsey; Intellectual Property Law Offices

(57) ABSTRACT

A magnetic induction device having at least one secondary induction assembly including a secondary winding is mounted on a rotary element. A magnetic flux is induced the secondary induction assembly, causing an induced secondary alternating current in the secondary winding of the secondary induction assembly. The secondary alternating current is converting to direct current and is stored in an electrical storage device.

1 Claim, 3 Drawing Sheets

APPARATUS FOR WIRELESS TRANSFER OF POWER TO A ROTATING ELEMENT

This application is a divisional of application Ser. No. 09/386,079 filed on Aug. 30, 1999 now U.S. Pat. No. 6,278,210.

BACKGROUND OF THE INVENTION

1. Field of the Invention

The present invention relates to an apparatus for controlling the transfer of power to a rotary element without the use of wires. It is useful in electroplating apparatus and more particularly, for recharging batteries which supply power to rotating elements in a rotary plater.

2. Description of the Background Art

There are many applications for devices with rotary elements which require some supply of electric current or charge to portions of the rotating elements. Electroplating is one of these applications. Electroplating has been used in the manufacture of thin film electronic components and magnetic read/write heads for disk drives. The quality of devices manufactured by this process is very sensitive to the uniformity of the metal films that are deposited. Uniformity of thickness is crucial as well as uniformity of composition of the deposit.

Using magnetic head manufacture as an example, the process is carried out by starting with a substrate, which has a conductive seed metal layer deposited on a planar surface (referred to as the "top" even though in most plating steps, this surface will actually face downward into the plating solution), the deposition of the seed metal usually having been accomplished by a vacuum deposition or sputtering process. A photo-resist stencil is placed on top of this conductive metal layer. The substrate is then connected to an electrical power supply, with the substrate becoming the cathode (usually) with respect to the plating bath when voltage is applied. An anode (for most purposes) is created in the form of a plate connected to a positive terminal of the power supply, submerged in a plating bath. The substrate is also placed to be in contact with the plating bath, usually just barely interfacing with the surface of the bath so that the face surface (top) of the substrate engages the liquid but the edges and reverse surface of the substrate do not. Positively charged metal ions (cations) are drawn to the negatively charged substrate, and a layer of metal accumulates on the exposed seed metal surface, until the desired thickness has been achieved.

As mentioned above, a primary concern is the uniformity of thickness of the metal deposit. In an effort to obtain more uniformity, one kind of electroplating device spins the substrate to minimize the effects of localized variation in ion concentrations in the electroplating solution. Although this generally improves uniformity, there may still be problems of non-uniformity with radial displacement across the substrate. The biggest factor in this non-uniformity is generally the drop off in electric field strength found near an edge or corner of the plating target area of the substrate. A particular element from the central portion of the plating target area which is bounded on all sides by identical elements can be presumed to have a generally uniform electrical field applied over its extent. An element at an edge of the plating target area, however, which does not have identical neighboring elements on all sides, can be expected to have an electric field which differs in strength and configuration from that found in interior elements. This element attracts metal ions differently and thus can result in a non-uniform deposition layer in these regions.

In an effort to compensate for these "edge effects" it has become common practice to include what is called a "thieving ring" around the perimeter of the substrate. This thieving ring is also negatively charged and serves to restore uniformity to the electric field at the edges of the substrate by providing similarly charged neighboring elements. The outer perimeter of the thieving ring has edge effects of its own, but is treated as a sacrificial element where the uniformity of metal deposition is unimportant.

Early thieving rings were constructed in one piece so that a uniform field was supplied around the entire perimeter of the substrate. However, it has been found that by segmenting the ring, and applying differing currents to the different segments, finer control of the electric field configuration could be achieved. This is especially useful when processing substrates and chip arrays on substrates which are not completely circular. For processing of substrates and arrays which are perhaps rectangular, or otherwise configured to have corners or protrusions, it is very beneficial to be able to adjust the charge on those specific thieving ring segments near those corners or protrusions in order to achieve more uniform field strength and thus achieve greater uniformity of deposition.

One problem in using a thieving ring having a number of segments is that power must be supplied to each segment independently from the others in order to optimize the electrical field. Therefore, at least one wire is required to be attached to each segment. In current practice, it is common to have sixteen segments, each with its own power supply wire. This number may increase to an even larger number of segments if finer control of the field configuration is desired. In addition, there are four wires required to supply power to the substrate itself. Thus, there may be a minimum of twenty wires involved. This number is increased when it may be necessary to sense the voltage and current on each supply wire in order to ensure that the proper fields are generated. In dealing with this great number of wires, the problem is compounded by the rotary nature of the cathode. Rotary connectors have an intrinsic problem relating to the difficulty of maintaining reliable electrical connections with a rotating element. Such connections are very prone to noise and friction effects. Any noise generated in the connection can be detrimental to the uniformity of the electric field and thus the uniformity of the deposition layer. When trying to maintain twenty to forty such rotary electrical connections, the odds of failure are thus greatly increased.

Power can be transferred to the cathode and the thieving ring segments through the shaft of the motor which drives the rotation of the cathode. A controller such as a microprocessor can then be mounted on the rotary substrate structure to control the current distribution to the thieving ring segments. Although it is theoretically possible to share part of the plating current from the plating power supply to power the microprocessor through the motor shaft as well, in practice, it has been found to be difficult to implement. Microprocessors and associated electronics are sensitive to plating supply fluctuations, which may stay at zero current for long periods of time. Thus an appropriate voltage divider storage and regulation circuit to supply power to the microprocessor is necessarily bulky, generates heat, and may interfere with the electroplater's performance. Further, the power supply to the substrate is typically a very highly sensitive constant current supply and it is desirable to avoid introducing variables which might affect the field generated about the substrate.

To address these problems, a battery can be mounted on the rotary cathode structure to supply power to the microprocessor. However, the rotary cathode, which may run at speeds of 1–50 RPM during plating, can run at as much as 5,000 RPM, when the plate is spun to dry it. The forces generated during such high-speed rotation can make mechanical fastening of batteries too costly, too heavy or too unreliable. Consequently, batteries have typically been hand-soldered in place, which necessitates a lengthy replacement operation when the batteries become depleted. Batteries which are rechargeable in place are therefore preferred, but again, there is the problem of transferring power across a rotating interface to charge them.

Many prior patents have dealt with the problems of improving uniformity of plating by using a rotary cathode plater.

U.S. Pat. No. 5,785,826 to GREENS PAN describes an apparatus for electroforming in which the entire cathode head is mounted on a lead screw by which the distance between the cathode and anode can be adjusted, in order to control uniformity of deposition.

U.S. Pat. No. 5,628,892 to Kawashima describes an electroplating apparatus and method using an arcuate segmented anode. Electroplated metal foil is produced by depositing metal ions from an electroplating bath on the surface of a rotating cathode drum. This device produces metal foil with minimized thickness variations.

U.S. Pat. No. 5,472,592 to Lowery discloses an electroplating apparatus in which a cathode plate both rotates and revolves around the inner surface of an electroplating tank.

Electrical connections are made through an elaborate series of concentric contact bushings which form three electrically isolated conducting paths to evenly distribute current to a substrate.

U.S. Pat. No. 4,304,641 to Grandia describes an electroplating cell having a rotary cathode using a thieving ring. A flow-through jet plate is used to provide differential flow distribution for the plating solution. Variable resistors, to keep the current constant, control electrical current to the cathode and ring.

Each of these patented devices uses either a rotating or revolving cathode in an effort to produce improved uniformity of plating, but none of these address the problem of providing reliable and noise-free supply of power to a microprocessor and associated electronics without using wires.

It is, therefore, an object of the present invention to provide an improved method and apparatus for reliably supplying power to a rotary element such as a microprocessor mounted on the cathode structure of a rotary plater. Other objects and advantages will become apparent from the following disclosure.

SUMMARY OF THE INVENTION

The present invention relates to an apparatus and method for supplying power to rotary devices and particularly to a microprocessor mounted on a rotary cathode structure.

The method comprises: i) providing a magnetic induction device having at least one secondary induction assembly including a secondary winding on a rotary element; ii) inducing a magnetic flux in the secondary induction assembly, thereby causing an induced alternating current in the secondary winding of the secondary induction assembly; iii) converting the secondary alternating current to direct current; and iv) storing the current in an electrical storage device.

The apparatus used to effectuate the method comprises: i) a rotating assembly which includes a secondary induction assembly having a secondary core and a secondary winding; ii) a magnetic induction device which produces an alternating current in the secondary winding of the secondary induction assembly; iii) a converter for converting the induced alternating current to direct current; and iv) an electrical storage device which stores the electric power. One more specific application of this more general apparatus is used in a rotary cathode plater, as described in detail below.

A more through disclosure of the present invention is presented in the detailed description which follows and the accompanying figures.

BRIEF DESCRIPTION OF THE DRAWINGS

The objects and, advantages and features of the present invention will be more clearly understood by reference to the following detailed disclosure and the accompanying drawings in which.

DETAILED DESCRIPTION OF THE INVENTION

Figure 1:
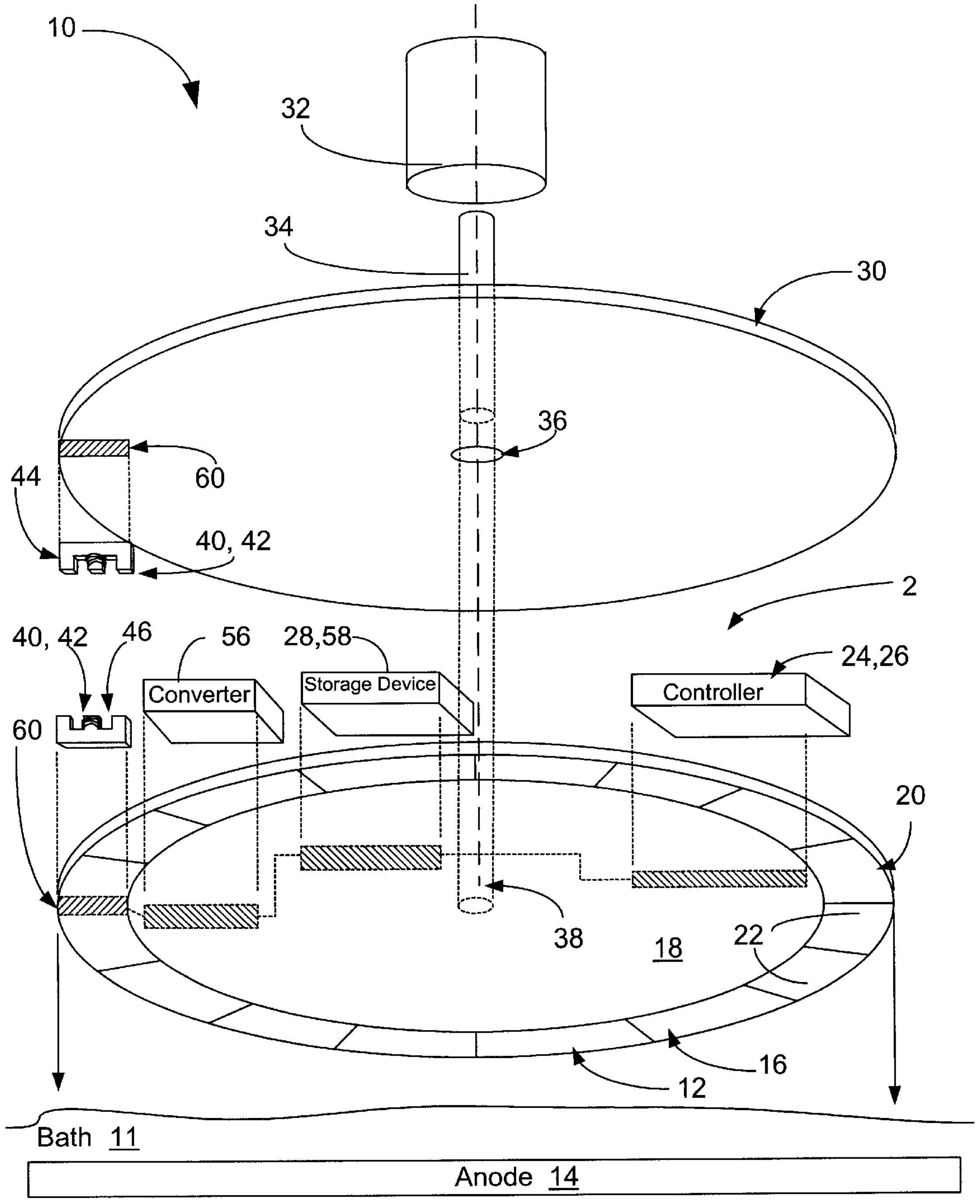
FIG. 1 illustrates an exploded perspective view of a rotary cathode plater with wireless power transfer.

The present invention relates to power supplies for charging electronic components on a rotating element, and specifically for maintaining battery charge in a rotating cathode assembly by magnetic coupling. Although the method disclosed here is applied to use in a rotary cathode plater, the method of wireless power transfer to an electrical storage device on a rotating element may be used in many other applications. As illustrated in the various drawings herein, and particularly in the view of FIG. 1, a preferred embodiment of the inventive apparatus is depicted by the general reference character 10.

FIG. 1 depicts an exploded perspective view of the major components of a rotary cathode plating apparatus 10 which features wireless power supply to the cathode 12. The more general case of a rotary element is depicted by the reference character 2, of which the rotary cathode plating apparatus 10 is a specific case.

No attempt has been made to draw the elements to scale, and a number of elements have been portrayed merely as featureless blocks when their internal structure is conventional. The plating apparatus 10 is attached to a support structure, which is not shown, and includes a tank containing plating solution, which is shown in a very general manner by the element labeled as bath 11. The anode 14 is shown, also in a very general manner, immersed in the bath 11. The anode 14 is not shown in a perspective view as it is typically some distance away from the rest of the structure.

The cathode 12 includes a substrate/thief assembly 16, which includes support structure 17 (see FIGS. 2 and 3), a substrate 18 to be plated, and a thieving ring 20 which is composed of a number of individually addressable segments 22. The substrate 18 is held against a support structure 17

Figure 2:
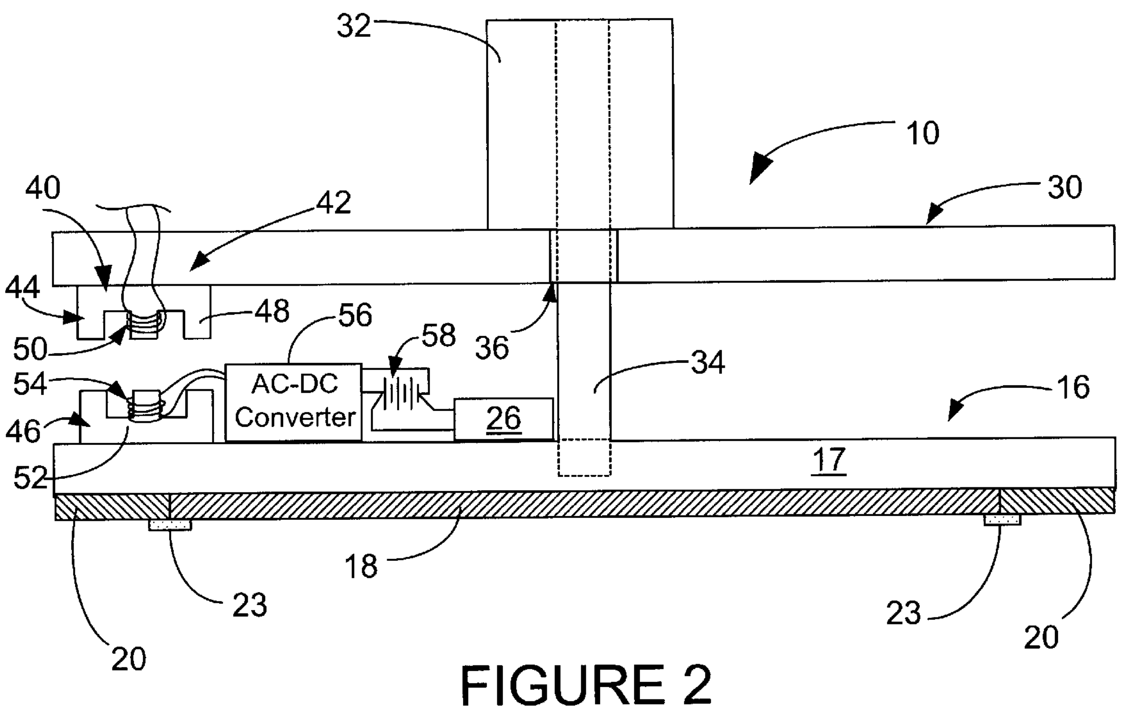
FIG. 2 is a side plan view of the first embodiment of an inductive charging apparatus used on a rotary cathode plater.

(see FIG. 2) in fixed position on the substrate/thief assembly 16 by a number of fasteners 23 (also see FIG. 2). Power distribution to the thieving ring segments 22 is directed by a controller 24 which, in this preferred embodiment, is a microprocessor 26. An electrical storage device 28 supplies power to the microprocessor 26.

The plating apparatus 10 includes a head assembly 30, which is mounted to some conventional support structure, not shown. A motor 32 acts to drive the rotation of the substrate/thief assembly 16 relative to the head assembly 30 by a motor shaft 34 which passes through a through channel 36 in the head assembly 30 and attaches to the support structure 17 of the substrate/thief assembly 16 at its central axis of rotation 38. It is assumed that the through channel 36 includes rotary bearings (not shown) which serve to keep the head assembly 30 in fixed spatial relation to the shaft 34. The head assembly 30 is not motivated to rotate by the motor 32.

In operation the cathode 12 is positioned so that the substrate 18 and thieving ring 20 are just barely in contact with the top surface of the bath 11. The motor 32 is then activated, which causes the substrate/thief 16 assembly to rotate.

The thieving ring 20 acts to provide a more uniform electric field to the substrate 18, which might otherwise suffer non-uniformity because the electric field drops off at the edges. This can cause "edge" or "bowl effects", where the wafer becomes thicker at the edge than in the interior. By segmenting the thieving ring 20, finer control of localized electric field strength can be achieved, and generally, the greater the number of segments 22, the more precise the control can be. The figure illustrates sixteen segments 22, but this is by no means a limit, either upper or lower, on the number of segments.

Electric power to the substrate 18 and the segments 22 of the thieving ring 20 is supplied by an external power supply (not shown) through the motor shaft 34. The power, once transferred to the substrate/thief assembly 16 is then directed by the microprocessor 26, which addresses each of these segments 22 and channels the power supplied. The microprocessor 26 optimizes and controls power distribution to the thief segments 22 through a voltage divider array (not shown) also mounted on the support structure 17 (see FIGS. 2 and 3). This allows the uniformity of the overall electric field strength to be precisely controlled. The electrical storage device 28, which in this preferred embodiment is a rechargeable battery 58, supplies power to the microprocessor 26, which then controls the flow of current to the thieving ring segments 22.

The storage device 28, which supplies the electric power to the microprocessor 26, eventually becomes depleted, and needs to be recharged periodically. For this purpose, a charging apparatus 40 transfers power from the stationary head assembly 30 to the rotary substrate/thief assembly 16 by a variety of wireless configurations.

The cathode 12 and head assembly 30 are shown in this figure as circular plates, but their geometries are not restricted to the shapes illustrated.

Referring now also to FIG. 2, the charging apparatus 40 in this preferred embodiment is a magnetic inductance device 42 having a primary assembly 44, and a secondary assembly 46. The primary assembly 44 includes a primary core element 48, and a primary winding element 50, while the secondary assembly 46 includes a secondary core element 52 and a secondary winding element 54. Connected to the secondary winding element 54 is an AC to DC converter 56 and the electrical storage device 28, which in this embodiment is a rechargeable battery 58. A programmable controller such as a microprocessor 26 draws power from the battery 58 and distributes power to a number "N" of thieving ring segments 22 as described above, through conventional voltage divider networks (not shown).

A processing cycle for a rotary plater apparatus 10 typically takes from 5 to 60 minutes to complete, during which the substrate/thief assembly 16 is in constant rotation. At the end of this processing cycle, however, the substrate/thief assembly 16 typically returns to a "home" position, depicted by the shaded areas 60 in FIG. 1, at which point, the substrate 18 may be detached by releasing the fasteners 23, and a new substrate loaded for plating. This home position 60 corresponds to an alignment of the primary assembly 44 directly above the secondary assembly 46. At this time, AC current is passed through the primary winding element 50 creating a magnetic field, which induces an AC current in the secondary winding 54 in the traditional manner of transformer circuits. This current is converted to DC current by a rectifying circuit or AC-DC converter 56 which then charges the rechargeable battery 58. The microprocessor 26 is then provided with power for the next processing cycle. It is anticipated that the power transferred to the battery during each charging cycle will be more than adequate to power an additional cycle, and in fact the charging cycle may be activated periodically only after multiple processing cycles have elapsed.

Although only one magnetic induction device 42 is shown in FIG. 1, it is of course possible to have multiple devices 42 positioned on the substrate/thief assembly 16. In fact, for considerations of proper balance, it is currently preferred to have at least two devices 42 symmetrically arranged on the substrate/thief assembly 16. Alternatively, a counterbalance of matching weight can be symmetrically positioned to provide proper balance.

Figure 3:
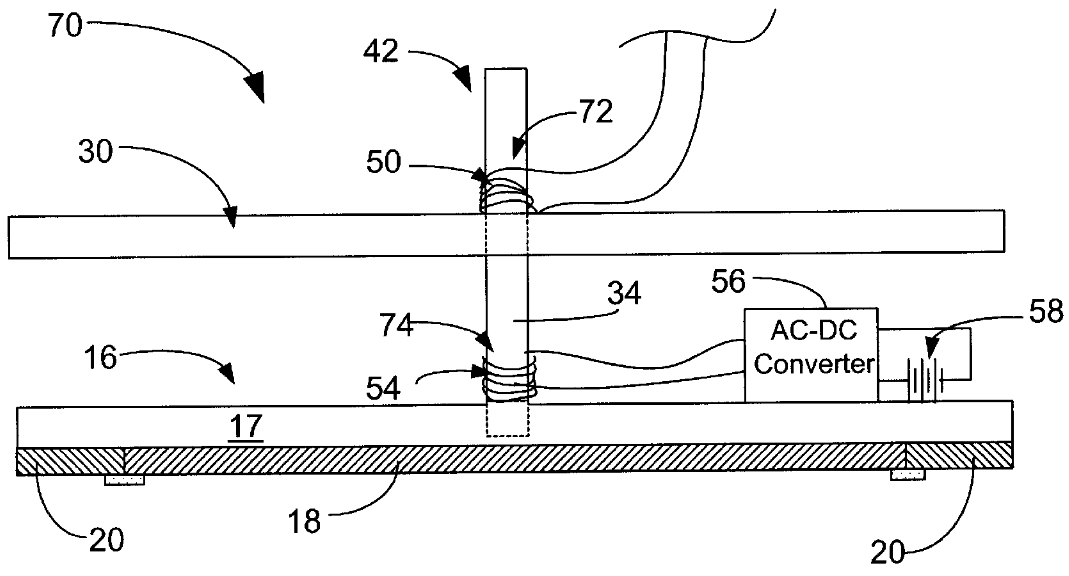
FIG. 3 is a side plan view of a second embodiment of an inductive charging apparatus used on a rotary cathode plater.

FIG. 3 illustrates a second preferred embodiment of the present invention designated by the reference numeral 70, again showing a magnetic inductance device 42. Where elements perform the same functions as previously described, they will be designated by the same reference numerals. No attempt has been made to draw the elements in proper scale to each other.

In FIG. 3, magnetic coupling is done by using the motor shaft 34 to channel and direct magnetic flux. A primary winding 50 is stationary with respect to the head assembly 30 and surrounds a first portion of the motor shaft 72. A secondary winding 54 surrounds a second portion of the motor shaft 74 and rotates along with the substrate/thief assembly 16 and the shaft 34. As AC current passes through the primary winding 50, magnetic flux is generated and channeled within the motor shaft 34 to the secondary winding 54, where a secondary AC current is generated, and then changed to DC current by a converter 56 in order to charge the battery 58.

This variation has the advantages that there are fewer components and there is less weight at a radial distance from the central axis which must be balanced. Also, recharging can take place at any time and at any radial position of the substrate/thief assembly 16 with respect to the head assembly 30, so that alignment of a primary assembly and secondary assembly is not required.

Figure 4:
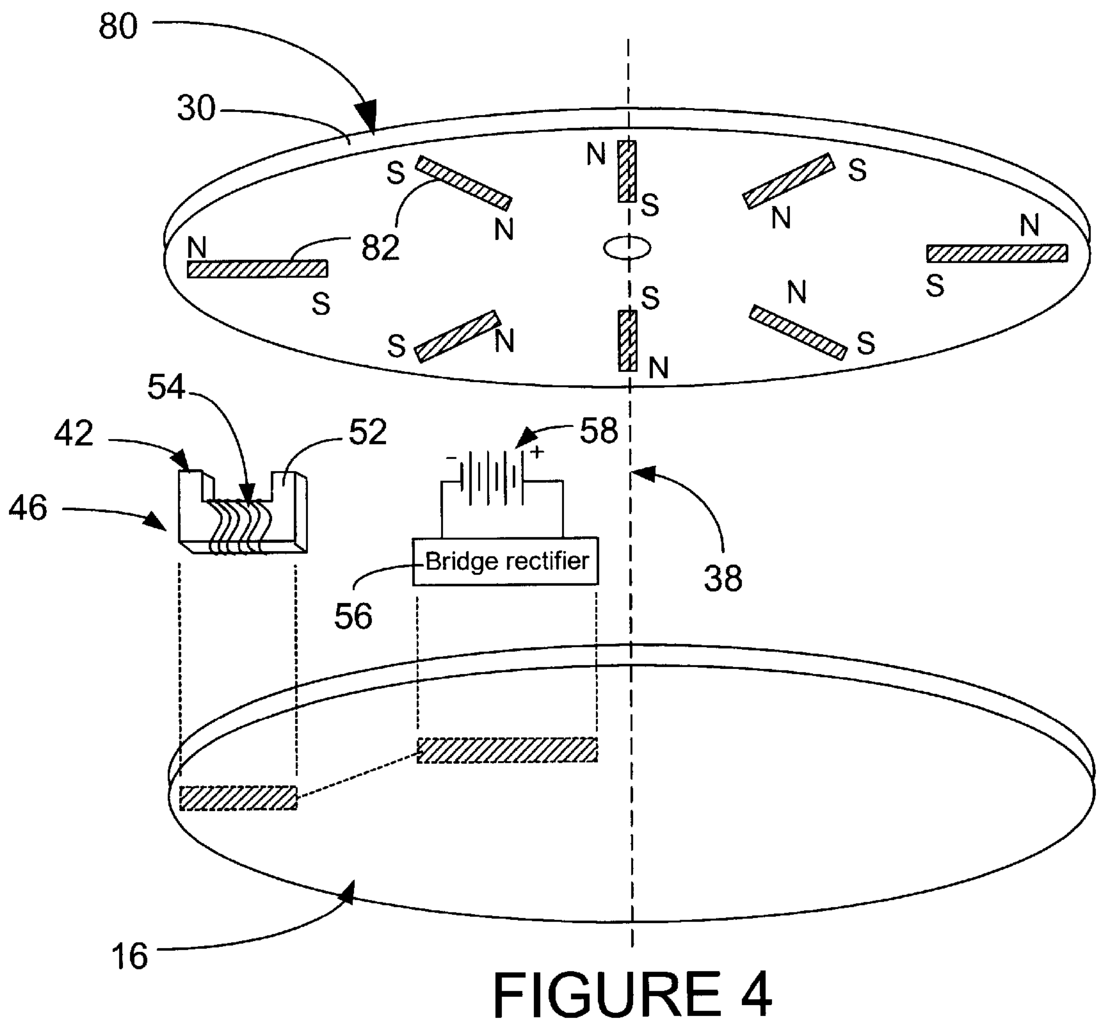
FIG. 4 is an exploded partial perspective view of the cathode structure portion of a rotary cathode plater, having a third type of inductive charging device.

A third preferred embodiment of the charging apparatus 80 is illustrated in FIG. 4. An exploded perspective view of the head assembly 30 and substrate/thief assembly 16 is shown. Once again, no attempt has been made to draw the elements in proper scale to each other. The head assembly 30 has now been fitted with a number of permanent magnets 82, extending in a radial direction from the central pivotal axis 38. These magnets 82 alternate in polarity as they pass above a secondary inductance assembly 46, which includes a secondary core element 52 and secondary winding 54. As the secondary inductance assembly 46 passes under the magnets with alternating polarity, an AC current is induced in the secondary winding 54, which is again converted to DC current by an AC-DC converter 56 such as a bridge rectifier, which again charges the battery 58.

This embodiment 80, of course, charges the battery 58 only as the device is rotating. This has the advantage that the entire processing cycle time, which can be long compared to the "downtime" between cycles, can be used to recharge the battery. It is anticipated that the charge generated during this time will be far in excess of that needed for recharging the battery, and thus recharging throughout the entire cycle may not be necessary.

As before, it is anticipated that multiple recharging devices 42 or counterweights may be used in order to maintain proper balance. Of course, the number and placement of the permanent magnets 82 are quite variable, and are certainly not limited to the configuration shown. In particular, the magnet may be arranged circumferentially on the head assembly instead of radially as shown in the figure. In this case, the magnetic inductance device will also be arranged circumferentially so that it will pass over alternating poles of the permanent magnets.

Figure 5:
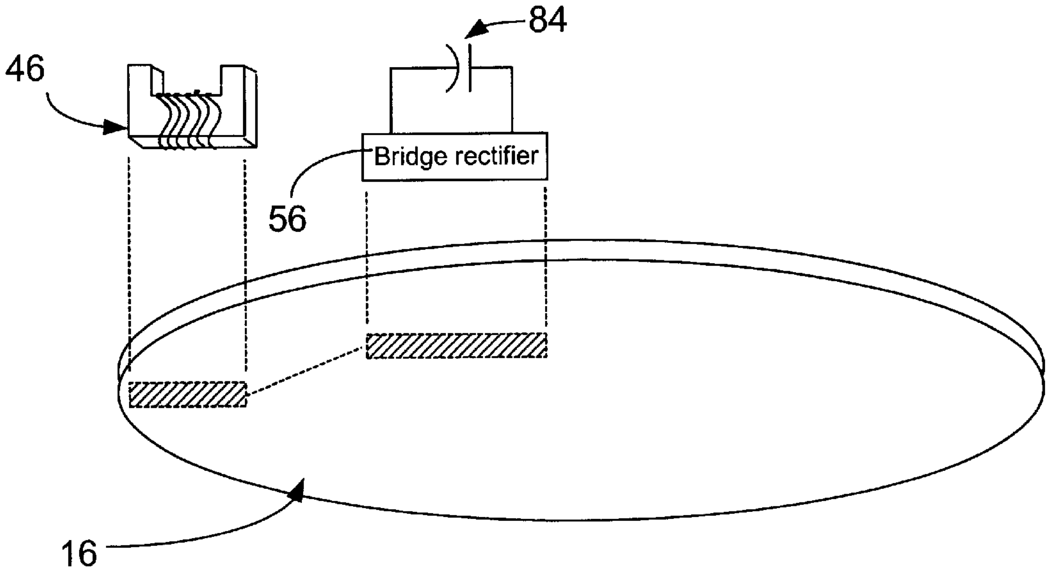
FIG. 5 is a perspective view of the cathode portion of a rotary cathode plater having a capacitor used as an electrical storage device.

A further variation is possible which can be used with any of the embodiments described above. FIG. 5 shows a substrate/thief assembly 16 including a secondary induction assembly 46 and a converter 56 in which a high capacitance capacitor 84 is used to replace the rechargeable battery. Capacitors typically have very long useable lifespans, typically outlasting comparable rechargeable batteries. They are also available in very thin "coin" shaped packages which are ideal for high RPM rotary applications, and which are more compact than batteries. The small amount of charge required for the microprocessor and thief-ring segments is easily stored by one or more capacitors.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

What is claimed is:

1. An apparatus for wireless transfer of power to a rotating element comprising:

a stationary assembly;

a rotating assembly which rotates relative to said stationary assembly, said rotating assembly including a secondary induction assembly having a secondary core and a secondary winding;

a stationary assembly including a motor, and a motor shaft, which drive rotation of said rotating assembly relative to said stationary assembly;

a magnetic induction device including a primary induction assembly mounted on said stationary assembly, said primary induction assembly having a primary winding, such that when said primary induction assembly is aligned with said secondary induction assembly and an alternating current is passed through said primary winding of said primary induction assembly, a secondary alternating current is induced in said secondary winding of said secondary induction assembly;

said motor shaft includes first and second portions, said first portion of said motor shaft being surrounded by said primary winding of said primary induction assembly, and said second portion of said motor shaft being surrounded by said secondary winding of said secondary induction assembly such that when alternating electric current is passed through said primary winding of said primary induction assembly, a magnetic flux is induced in said motor shaft, said magnetic flux extending from said first motor shaft portion into said second motor shaft portion, which then induces an alternating electric current in said secondary winding of said secondary induction assembly;

a converter for converting the induced alternating current to direct current; and an electrical storage device which stores electric power.

* * * * *